United States Patent Office 3,146,249
Patented Aug. 25, 1964

3,146,249
POLYMETHYLHYDROGENSILANES
Richard W. Alsgaard, Henry Nelson Beck, and Edwin P. Plueddemann, Midland, Mich., assignors to Dow Corning Corporation, Midland, Mich., a corporation of Michigan
No Drawing. Filed Oct. 25, 1960, Ser. No. 64,958
4 Claims. (Cl. 260—448.2)

This invention relates to novel polysilane compositions.
It is known from U.S. Patent 2,554,976 that dimethyl polysilanes can be prepared by reacting dimethyldichlorosilane with alkali metals. It is also known from U.S. Patent 2,606,879 that methyl higher alkyl polysilanes can be prepared by reacting methyl higher alkyldichlorosilanes with alkali metals. However, neither of these patents describe the manufacture of polymethylhydrogensilanes.

Applicants have discovered unexpectedly that polymethylhydrogensilanes are useful as rocket propellants and as explosives. It has further been discovered that the silanes of this invention produce a higher specific impulse when burned with oxidizing agents than the corresponding dialkylpolysilanes. Thus, it is the object of this invention to prepare materials suitable for use in novel rocket propellants and explosives. Other objects and advantages will be apparent from the following description.

This invention relates to compositions of matter having the formula $(MeHSi)_x$ and $$R_3Si(\underset{Me}{\overset{H}{Si}})_y SiR_3$$

in which R is selected from the group consisting of methyl radicals and hydrogen atoms, at least one R per silicon being methyl, $x$ is an integer of at least 5, and $y$ is an integer of at least 1.

This invention also relates to copolymeric polysilanes containing at least 10 mol percent methylhydrogensilyl (MeHSi) units, the remainder of the units being dimethylsilyl ($Me_2Si$) units. These copolymers can, if desired, be endblocked with $R_3Si$ units where R is as above defined.

The compositions of this invention are best prepared by reacting methyldichlorosilane or mixtures of methyldichlorosilane with dimethyldichlorosilane and/or silanes of the formula $R_3SiCl$ with an alkali metal. The reaction is best carried out in a hydrocarbon medium such as benzene, toluene, xylene, or petroleum ethers. The temperature of the reaction is not critical.

The reaction can be carried out with any alkali metal such as lithium, sodium, potassium or cesium. However, it is preferred to use an alloy of sodium and potassium either in the form of $K_2Na$ or $Na_2K$. These alloys are preferred because they promote the reaction at low temperatures and hence give superior yields of the desired product.

As can be seen from above the $R_3SiCl$ silane can be trimethylmonochlorosilane, dimethylmonochlorosilane or monomethylmonochlorosilane.

In preparing the compositions of this invention care should be exercised to protect the material from oxygen during the preparation. This can be done by carrying out the reaction and purification of the product in an atmosphere of an inert gas such as nitrogen, argon, helium or the like.

The compositions of this invention are particularly adaptable for use as rocket propellants since when mixed with an oxidizing agent and burned they give superior specific impulse to heretofore known polysilanes. The use of these materials as propellants and the compositions of said propellants are fully described and claimed in the applicants' copending application Serial Number 64,953, entitled "Rocket Propellants," filed concurrently herewith, the entire disclosure of said application being hereby incorporated in this application by reference.

For use as rocket fuel propellants the compositions of this invention should be in the form of soluble fluids or waxy materials which can be vulcanized to rubbery solids. Ideally the materials should melt below 125° C. However, for use as explosives it is not necessary that the material be in the form of soluble liquid or waxy materials but they may be in the form of insoluble, dry powders. This is true because it is not critical for use as an explosive that the material be cast into a void-free unitary mass.

The term "consisting essentially of" as employed herein means that the materials are essentially of the compositions shown but they may contain small amounts of unreacted chlorine or traces of oxygen which do not materially affect the properties of the compositions.

The following examples are illustrative only and should not be construed as limiting the invention which is properly delineated in the appended claims.

The abbreviation Me is employed herein for the methyl radical.

*Example 1*

The alloy $K_2Na$ was made by stirring a mixture of 60.3 g. of rock salt, 82.6 g. of potassium and 24.7 g. of sodium in 500 ml. of refluxing dry toluene. The mixture was stirred vigorously and the process was carried out in a nitrogen atmosphere. The rock salt was employed for the purpose of atomizing the liquid alloy.

The mixture was allowed to cool and there was then added 189 g. of methyldichlorosilane over a period of 1½ hours. During this time the temperature was kept below 30° C. The mixture was then stirred at room temperature overnight. It was then filtered under nitrogen and the filtrate was heated under 1 mm. pressure to remove the solvent. There was obtained 39.5 g. of a cloudy, light yellow fluid having the formula $$\underset{H}{\overset{Me}{(Si)_x}}$$

where $x$ had an average value greater than 5.

The polysilane ignited spontaneously when spread out in a thin layer in air.

*Example 2*

Employing the procedure of Example 1 the alloy $Na_2K$ was prepared. A mixture of 714.7 g. of methyldichlorosilane and 107.4 g. of dimethylmonochlorosilane was then added to a toluene mixture of the alloy over a period of 27 minutes. The mixture was then stirred at a temperature below 46° C. overnight. The product was filtered under nitrogen and the toluene was evaporated to give 185 g. of a light green fluid having a viscosity of 438 cs. This material had a formula $$Me_2HSi(\underset{H}{\overset{Me}{Si}})_x SiMe_2H$$

where $x$ had an average value of 12. Analysis showed that it contained no siloxane linkages.

The polysilane was spontaneously inflammable when spread in a thin film in air.

*Example 3*

To 52 g. of molten sodium in 200 ml. of refluxing xylene was added a mixture of 116 g. of dimethyldichlorosilane, 11.5 g. of methyldichlorosilane and 10.8 g. of trimethylmonochlorosilane. The mixture was heated for 8 hours longer and then cooled and filtered. The filter was washed with dry toluene and the combined filtrates were heated to remove the solvent. There was obtained 30 g. of a white paste having the average formula

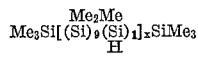

Example 4

The procedure of Example 3 was repeated except that 100 g. of sodium, 115 g. of methyldichlorosilane, 129 g. of dimethyldichlorosilane and 19 g. of dimethylmonochlorosilane were employed. There was obtained 95 g. of a yellow-green oil having a viscosity of 50 cs. This material had an average formula

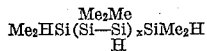

where $x$ has an average value of about 10.

Example 5

A liquid product is obtained when a mixture of 129 g. of dimethyldichlorosilane and 115 g. of methyldichlorosilane are reacted in accordance with the procedure of Example 1. The product has the formula

where $x$ has an average value greater than 3.

That which is claimed is:

1. As a composition of matter a polysilane consisting essentially of the formula selected from the group consisting of $(MeHSi)_x$ where $x$ is an integer of at least 5 and

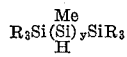

where R is selected from the group consisting of methyl radicals and hydrogen atoms, at least one R per silicon being methyl, and $y$ has a value of at least 1.

2. As a composition of matter a polysilane of the formula $(MeHSi)_x$ where $x$ has a value of at least 5.

3. A copolymeric polysilane consisting essentially of silyl units of the group consisting of methylhydrogensilyl units and dimethylsilyl units and any remaining units in said copolymer being of the formula $R_3Si$ where R is selected from the group consisting of methyl radicals and hydrogen atoms, at least one R group per silicon being methyl, in said copolymer there being at least 10 mol percent methylhydrogensilyl units.

4. A copolymer consisting essentially of at least 10 mol percent methylhydrogensilyl units, the remaining units being dimethylsilyl units.

References Cited in the file of this patent

UNITED STATES PATENTS

| | | |
|---|---|---|
| 2,554,193 | Hunter | May 22, 1951 |
| 2,554,976 | Burkhard | May 29, 1951 |
| 2,612,458 | Stedman | Sept. 30, 1952 |
| 2,777,772 | Stedman | Jan. 15, 1957 |
| 2,923,633 | Stedman | Feb. 2, 1960 |